United States Patent
Hoop et al.

(10) Patent No.: US 9,539,708 B2
(45) Date of Patent: Jan. 10, 2017

(54) HAND-HELD POWER TOOL

(71) Applicant: Hilti Aktiengesellschaft, Schaan (LI)

(72) Inventors: Alexander Hoop, Schaan (LI); Albert Binder, Buchs (CH); Michael Wierer, Bludenz (AT); Dieter Profunser, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 448 days.

(21) Appl. No.: 14/356,515

(22) PCT Filed: Oct. 17, 2012

(86) PCT No.: PCT/EP2012/070525
§ 371 (c)(1),
(2) Date: May 6, 2014

(87) PCT Pub. No.: WO2013/068209
PCT Pub. Date: May 16, 2013

(65) Prior Publication Data
US 2014/0326474 A1    Nov. 6, 2014

(30) Foreign Application Priority Data
Nov. 7, 2011 (DE) .......................... 10 2011 085 820

(51) Int. Cl.
*E21B 3/00* (2006.01)
*E21B 17/22* (2006.01)
(Continued)

(52) U.S. Cl.
CPC ................. *B25B 21/02* (2013.01); *F16D 5/00* (2013.01); *F16D 37/02* (2013.01); *F16D 2037/002* (2013.01)

(58) Field of Classification Search
CPC .......... E21B 4/02; E21B 41/0085; E21B 6/00; B25B 21/02; B25F 5/005
(Continued)

(56) References Cited

U.S. PATENT DOCUMENTS

| | | | |
|---|---|---|---|
| 2004/0020667 A1 | 2/2004 | Gokturk et al. | |
| 2005/0087410 A1* | 4/2005 | Namuduri | F16F 9/535 188/267.2 |

(Continued)

FOREIGN PATENT DOCUMENTS

| | | |
|---|---|---|
| EP | 0839612 | 5/1998 |
| EP | 146 22 19 | 9/2004 |

(Continued)

*Primary Examiner* — Robert Long
(74) *Attorney, Agent, or Firm* — Davidson, Davidson & Kappel, LLC

(57) ABSTRACT

A hand-held power tool has a motor, a tool holder, and a percussion mechanism disposed between the motor and the tool holder in the drive train. The percussion mechanism includes a first shaft and a second shaft. A magnetically conductive ring gear is connected to the first shaft. An inner wall of the ring gear is eccentric to an axis of the second shaft. A magnetically conductive impeller is connected to the second shaft and is arranged to rotate within the ring gear. The impeller is spaced from the ring gear by a first air gap in a first position while being spaced from the ring gear by a second air gap in a second position, the first air gap being smaller than the second one. A magnet array is arranged coaxially to the second shaft. A magnetorheological fluid fills a cavity between the ring gear and the impeller.

10 Claims, 2 Drawing Sheets

(51) Int. Cl.
*E21B 19/16* (2006.01)
*E21B 19/18* (2006.01)
*B25B 21/02* (2006.01)
*F16D 37/02* (2006.01)
*F16D 5/00* (2006.01)
*F16D 37/00* (2006.01)

(58) Field of Classification Search
USPC ............ 173/2, 114, 117, 118, 201–204, 121, 212,173/176, 132, 48, 104, 109, 217–218
See application file for complete search history.

(56) References Cited

U.S. PATENT DOCUMENTS

| | | | | |
|---|---|---|---|---|
| 2007/0010119 | A1* | 1/2007 | Hall | E21B 17/028 439/310 |
| 2007/0114064 | A1* | 5/2007 | Hall | E21B 4/00 175/57 |
| 2007/0221408 | A1* | 9/2007 | Hall | E21B 4/06 175/57 |
| 2008/0289440 | A1* | 11/2008 | Denk | H02K 7/09 74/89.34 |
| 2010/0236802 | A1* | 9/2010 | Berger | B25D 11/064 173/118 |
| 2011/0121223 | A1* | 5/2011 | Ulicny | F16F 9/535 252/62.52 |
| 2013/0133909 | A1* | 5/2013 | Greenwood | B06B 1/04 173/90 |
| 2013/0133910 | A1* | 5/2013 | Riedl | B25D 16/00 173/109 |
| 2014/0311763 | A1* | 10/2014 | Hoop | B25B 21/02 173/218 |
| 2015/0075833 | A1* | 3/2015 | Dotan | B23Q 5/06 173/218 |

FOREIGN PATENT DOCUMENTS

| | | |
|---|---|---|
| EP | 1677022 | 7/2006 |
| JP | 55020917 | 2/1980 |

* cited by examiner

HAND-HELD POWER TOOL

The present invention relates to a hand-held power tool including a percussion mechanism for generating angular momenta, in particular a hand-held power tool including such a percussion mechanism.

SUMMARY OF THE INVENTION

The present invention provides a hand-held power tool that includes a motor, a tool holder and a percussion mechanism which is connected in a drive train between the motor and the tool holder. The percussion mechanism includes a first shaft and a second shaft, of which selectively the first shaft or the second shaft is connected to the motor on the drive side. A hollow wheel is connected to the first shaft. An inner wall of the hollow wheel is not rotation-symmetrical with respect to an axis of the second shaft, i.e., first areas of the inner wall are closer to the axis in the radial direction than second areas of the inner wall. An impeller is connected to the second shaft and the impeller is rotatably situated within the hollow wheel. In a first position, the impeller is spaced apart from the hollow wheel by a first air gap, and in a second position, the impeller is spaced apart from the hollow wheel by a second air gap, the first air gap being smaller than the second air gap. The absence of rotational symmetry of both the inner wall and of the impeller causes the different positions.

A magnetic system is situated coaxially to the second shaft. A magnetic field of the magnetic system flows through the impeller and the hollow wheel, which are both made of a magnetically conductive material. The magnetic flux is increased (first position) or decreased (second position) as a function of the position of the impeller.

A magnetorheological fluid fills a cavity between the hollow wheel and the impeller. The viscosity of a magnetorheological fluid is dependent on the magnetic field and typically increases with increasing magnetic flux and magnetic field strength. Depending on the relative position of the impeller and the hollow wheel, the viscosity increases or the viscosity decreases. Torque coupling of the impeller to the hollow wheel increases when these approach the first positions due to the additionally increased viscosity.

For example, a motor may accelerate the second shaft relative to the first shaft essentially without transmitting torque if the viscosity is low, in order to then give off the absorbed angular momentum within a short time as high torque when the viscosity increases.

One embodiment provides for the inner wall to have one or multiple pole shoes projecting toward the axis. The pole shoes are preferably situated at equidistant distances around the axis, corresponding to a multifold rotational symmetry. The number of pole shoes may be equal to a number of vanes of the impeller. In a first position, all pole shoes are faced by one vane.

One embodiment provides for a magnetic back iron to extend from a side of the magnet which faces away from the hollow wheel to the hollow wheel. The back iron surrounds the magnet in a cup shape, for example. The second shaft may be made of a magnetically conductive material. The magnetic field is conducted from the back iron and the second shaft to the drum and the impeller. The magnet preferably has a radial-symmetrical or rotation-symmetrical design in order to have a corresponding symmetry around the axis.

One embodiment provides for the hollow wheel to be closed along the axis by a cover and a bottom toward a chamber in which the impeller and the magnetorheological fluid are situated.

One embodiment provides for the magnet to be attached to a housing of the hand-held power tool or to the second shaft. The drum is freely rotatable with respect to the magnet.

One embodiment provides for the magnet to include a solenoid and a settable power source and for an operating element for setting a current delivered by the power source to be present. As an alternative or in addition, a control unit may increase a current flow from the power source when the impeller approaches one of the first positions, i.e., when the tips of the impeller approach the pole shoes of the hollow wheel. The control unit may subsequently reduce the current flow after a predefined time period. The power source is operated in a pulsed manner to save energy, in particular when the device is battery-operated.

BRIEF DESCRIPTION OF THE DRAWINGS

The following description explains the present invention based on exemplary specific embodiments and figures.

Identical or functionally equivalent elements are identified by identical reference numerals in the figures, unless indicated otherwise.

DETAILED DESCRIPTION

Figure 1:
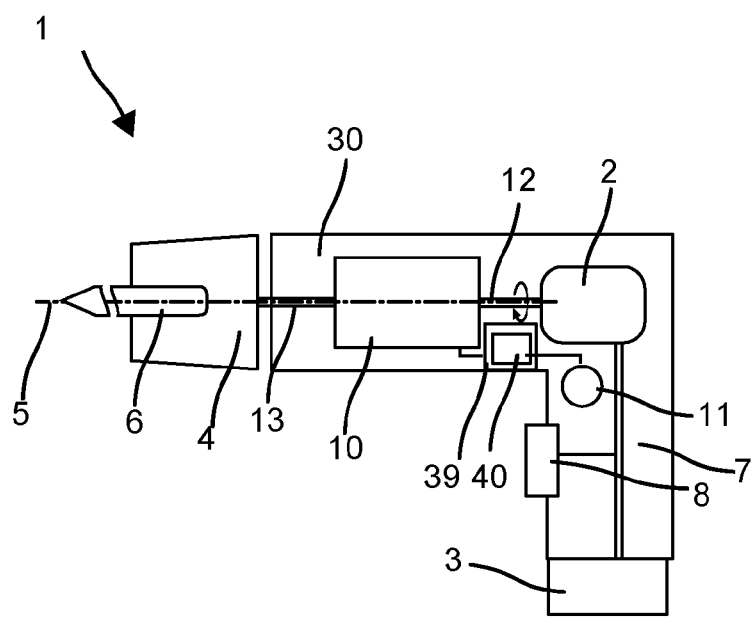
FIG. 1 shows a percussion screwdriver.

FIG. 1 shows an electric percussion screwdriver 1 as one example of a hand-held power tool. An electric motor 2, which is electrically powered via a rechargeable battery pack 3, for example, is the primary drive system. During operation, a tool holder 4 is rotatably driven about a working axis 5 by electric motor 2. Tool holder 4 is designed to detachably accommodate a screwdriver bit, a drill or other tools 6 and to transfer the rotational movement to this tool. A user may guide percussion screwdriver 1 with the aid of a handle 7 and put it into operation with the aid of a system switch 8. Percussion screwdriver 1 has a percussion mechanism 10 which couples electric motor 2 to tool holder 4. Percussion mechanism 10 generates a pulsating torque from the uniformly delivered torque of electric motor 2, the pulsating torque being passed on to tool holder 4. An amplitude of the torque pulses is settable with the aid of a selector switch 11.

Figure 2:
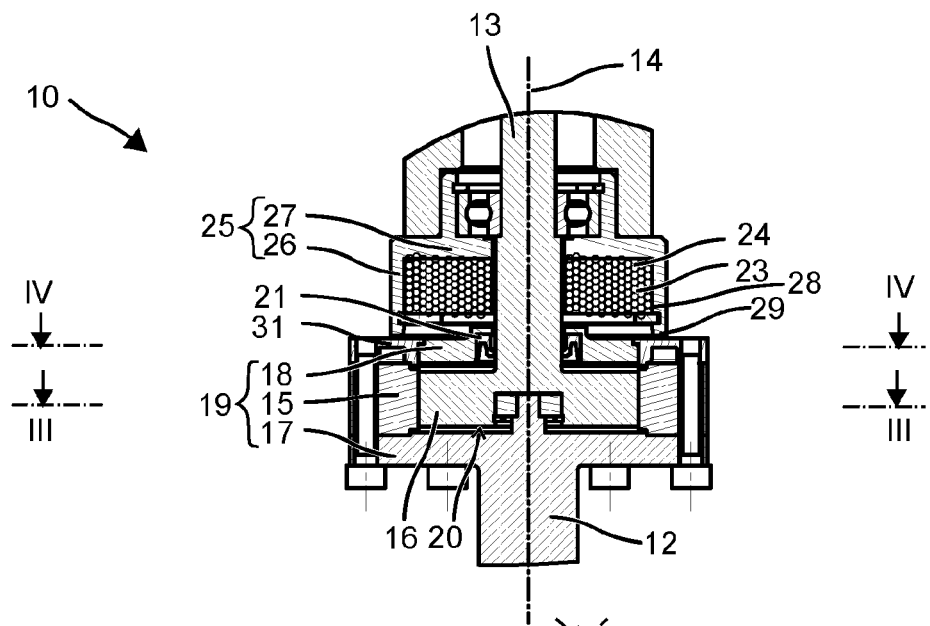
FIGS. 2, 3 and 4 show a percussion mechanism in various sectional views.
Figure 3:
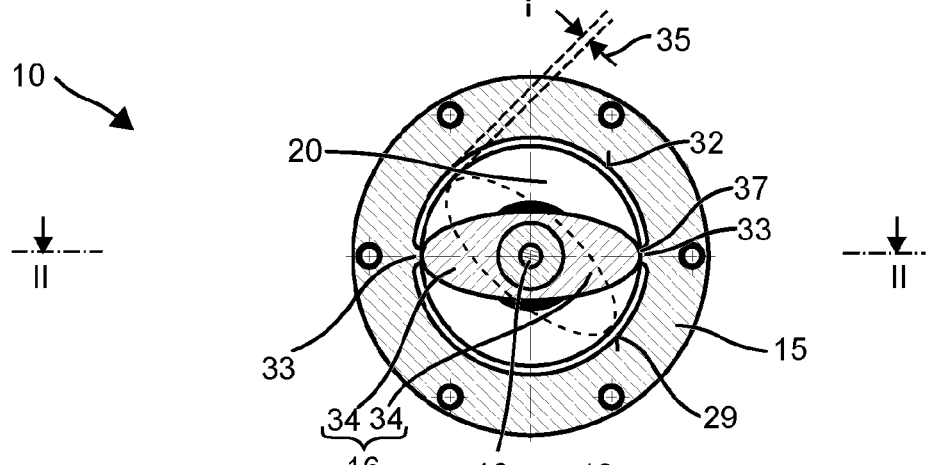
Figure 4:
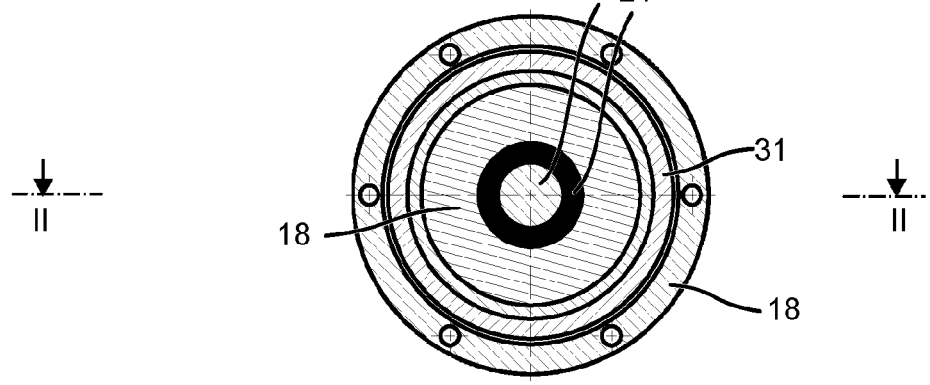

FIG. 2 shows percussion mechanism 10 in a longitudinal section on plane II-II; FIG. 3 shows percussion mechanism 10 in a cross section on plane III-III; and FIG. 4 shows percussion mechanism 10 in a cross section in plane IV-IV. Percussion mechanism 10 has an input shaft 12 and an output shaft 13, which are situated coaxially to each other and rotatably about axis 14, for example. Input shaft 12 is rotatably fixedly connected to a hollow wheel 15 and may drive the same about axis 14. An impeller 16 is situated with play within hollow wheel 15, i.e., impeller 16 and hollow wheel 15 are rotatable relative to each other. Impeller 16 is rotatably fixedly connected to output shaft 13.

Hollow wheel 15, together with a bottom 17 and a cover 18, forms a drum 19 which closes chamber 20. Cover 18 and bottom 17 may be rotatably fixedly connected to hollow wheel 15 or may be sealed by a floating seal on hollow wheel 15. Impeller 16 is situated within a chamber 20; output shaft 13 is guided through cover 18 with the aid of a sealing bearing 21.

Torque is indirectly transmitted from hollow wheel 15 to impeller 16, or vice versa, via a magnetorheological fluid 22 which fills chamber 20 within hollow wheel 15. A viscosity of magnetorheological fluid 22 is switched by a relative position of hollow wheel 15 and impeller 16.

A magnet 23 is provided outside drum 19 around output shaft 13. For example, magnet 23 is a solenoid having magnetic coils 24 which are wound around output shaft 13. Magnetic coils 24 may be rotatably mounted relative to output shaft 13. Moreover, magnetic coils 24 are situated opposite cover 18 of drum 19. The generated magnetic field is concentric, preferably rotation-symmetrical or at least rotationally symmetric to rotational axis 14.

A back iron 25 made of a magnetically conductive material, e.g., ferromagnetic steel, surrounds magnetic system 23 in a cup-shaped manner, i.e., with a cylindrical jacket 26 surrounds radial outer surfaces of magnet 23 and with a bottom 27 surrounds a side 28 facing away from drum 19. Cylindrical jacket 26 is spaced apart from hollow wheel 15 via a small air gap 29. Cylindrical jacket 26 and hollow wheel 15 overlap in a projection toward a plane perpendicular to axis 14, whereby a magnetic flux between them is primarily conducted parallel to axis 14.

Magnet 23 and/or back iron 25 is/are preferably attached to housing 30 of hand-held power tool 1.

Output shaft 13 is preferably made of a magnetically conductive material, e.g., ferromagnetic steel; impeller 16 and hollow wheel 15 are also made of magnetically conductive material. A magnetic flux flows axially along output shaft 13, through impeller 16 in the radial direction toward hollow wheel 15, and back parallel to axis 14 via a back iron. Bottom 17 and cover 18 are made of a magnetically non-conductive material, e.g., aluminum, or chromium steel. A ring-shaped insert 31 made of a magnetically conductive material in cover 18 is situated in axial extension of back iron 25.

Hollow wheel 15 has a non-rotation-symmetrical inner wall 32. Exemplary inner wall 32 is largely cylindrical and has two diametrically opposed, radially inwardly projecting pole shoes 33. Except for minor play, a distance of pole shoes 33 is identical to the diameter of impeller 16. Impeller 16 is also not rotation-symmetrical and has two diametrically situated vanes 34. In a first position, impeller 16 is separated from pole shoes 33 on inner wall 32 only by a small air gap. In a second position (dotted illustration), which is rotated relative to the first position, an air gap 35 between impeller 16 and inner wall 32 is larger. A magnetic flux from tips 37 of vanes 34 to hollow wheel 15 is greater in the first position than in the second position due to the smaller air gap. Impeller 16 acts as a rotary switch for the magnetic field.

Chamber 20, i.e, the space between impeller 16 and hollow wheel 15, is filled with a magnetorheological fluid. A viscosity of the magnetorheological fluid increases in the surroundings of a high magnetic flux. The high magnetic flux in the first position thus causes high viscosity around pole shoes 33 and tips 37 of impeller 16, while the viscosity at pole shoes 33 and tips 37 drops in the second position.

Alternative specific embodiments may include a larger number of magnets, which are preferably situated at equidistant angular increments around rotational axis 14, thus forming a correspondingly higher number of poles and a multifold symmetry. Pole shoes 33 are preferably situated close to jacket 15 in the radial direction.

A dimension of viscous area 38 has the order of magnitude of the dimension of pole shoe 33. An angular dimension of pole shoes 33 is less than 20 degrees. Pole shoes 33 account for less than 10% of the circumference of inner wall 32. Vanes 34 have a limited dimension in the circumferential direction. The angular dimension of tips 37 is preferably less than 30 degrees. Impeller 16 may thus assume positions in which impeller 16 causes a magnetic closure with pole shoes 33 (first positions) and without magnetic closure (second positions).

Exemplary impeller 16 has exactly two vanes 34, which is equal to the number of two pole shoes 33. In alternative specific embodiments, impeller 16 has three or more vanes, which are preferably situated with rotational symmetry corresponding to their number. The inner wall 32 is provided with the same number of pole shoes 33, which are situated equidistantly, whereby the same rotational symmetry is obtained.

The viscosity of the magnetorheological fluid may additionally be controlled by the magnetic field strength of magnets 23. In particular, a power source 39 is provided with powers coils 24. A supplied current may be switched by a control unit 40 and/or adjusted in terms of the amplitude to deactivate the magnetic field or lower the magnetic field strength. The maximally transmittable torque is directly settable by the magnetic field strength with the aid of control unit 40. A user may predefine settings of control unit 40 with the aid of selector switch 11. Moreover, control unit 40 may ascertain whether vanes 34 are situated opposite pole shoes 33 and, in response thereto, may increase the magnetic field strength and lower the same after a predefined time period. For example, the magnetic field may be increased when the impeller is no more than 10 degrees before the first position, the coinciding position of vane 34 and pole shoe 33. It must be taken into consideration that the magnetorheological fluid builds up its viscosity with delay after the magnetic field is applied. Impeller 16 is initially maximally blocked and is then actively released. The opposite positioning or approaching may be detected, for example, with the aid of a position sensor for sensing a relative position of impeller 16 and drum 19 or with the aid of an acceleration sensor for sensing a deceleration of impeller 16.

The magnetically conductive materials preferably have a relative permeability of greater than 100; the magnetically non-conductive materials preferably have a relative permeability in the range of 1, similar to air.

What is claimed is:
1. A hand-held power tool comprising:
   a motor;
   a tool holder; and
   a percussion mechanism connected in a drive train between the motor and the tool holder, the percussion mechanism including:
   a first shaft,
   a second shaft,
   a hollow wheel connected to the first shaft and whose inside wall is not rotation-symmetrical with respect to an axis of the second shaft,
   an impeller connected to a second shaft and rotatably situated within the hollow wheel,
   a magnet situated coaxially to the second shaft, and
   a magnetorheological fluid filling a cavity between the hollow wheel and the impeller,
   in a first position, the impeller being spaced apart from the hollow wheel by a first air gap, and in a second position, the impeller being spaced apart from the hollow wheel by a second air gap, the first air gap being smaller than the second air gap, and the impeller and the hollow wheel being made of a magnetically conductive material.

2. The hand-held power tool as recited in claim 1 wherein the inner wall includes one or multiple pole shoes projecting toward the axis.

3. The hand-held power tool as recited in claim 2 wherein the number of pole shoes is equal to the number of vanes of the impeller.

4. The hand-held power tool as recited in claim 1 wherein a magnetic back iron extends from a side of the magnet facing away from the hollow wheel to the hollow wheel.

5. The hand-held power tool as recited in claim 1 wherein the second shaft is made of a magnetically conductive material.

6. The hand-held power tool as recited in claim 1 wherein the hollow wheel is closed along the axis by a cover and a bottom toward a chamber in which the impeller and the magnetorheological fluid are situated.

7. The hand-held power tool as recited in claim 1 wherein the magnet is attached to a housing of the hand-held power tool or to the second shaft.

8. The hand-held power tool as recited in claim 1 wherein the magnet includes a solenoid and a settable power source, and further comprising an operating element for setting a current delivered by the power source.

9. The hand-held power tool as recited in claim 1 wherein the magnet includes a solenoid and a settable power source, and a control unit increases a current flow from the power source when the impeller approaches the first position.

10. The hand-held power tool as recited in claim 9 wherein the control unit reduces the current flow after a predefined time period after which the impeller approaches the first position.

\* \* \* \* \*